US00RE45410E

(19) United States
(12) Reissued Patent
Sorensen

(10) Patent Number: US RE45,410 E
(45) Date of Reissued Patent: *Mar. 10, 2015

(54) APPARATUS AND METHOD FOR PROVIDING, RETRIEVING, AND USING DATA GUIDE INFORMATION SUPPLIED IN A DIGITAL VESTIGIAL SIDEBAND SIGNAL

(71) Applicant: Tom L. Sorensen, Naperville, IL (US)

(72) Inventor: Tom L. Sorensen, Naperville, IL (US)

(73) Assignee: LG Electronics Inc. (KR)

( * ) Notice: This patent is subject to a terminal disclaimer.

(21) Appl. No.: 13/721,789

(22) Filed: Dec. 20, 2012

Related U.S. Patent Documents

Reissue of:

(64) Patent No.: 6,598,226
Issued: Jul. 22, 2003
Appl. No.: 09/434,559
Filed: Nov. 12, 1999

U.S. Applications:

(63) Continuation of application No. 13/223,513, filed on Sep. 1, 2011, now Pat. No. Re. 43,988.

(51) Int. Cl.
*G06F 3/00* (2006.01)
*G06F 13/00* (2006.01)

(52) U.S. Cl.
USPC ..... 725/56; 725/51

(58) Field of Classification Search
USPC ..... 725/37–40, 49, 51, 56, 109, 110, 112, 725/136
See application file for complete search history.

(56) References Cited

U.S. PATENT DOCUMENTS

| | | | |
|---|---|---|---|
| 4,568,909 | A | 2/1986 | Whynacht |
| 4,746,983 | A | 5/1988 | Hakamada |
| 4,903,129 | A | 2/1990 | Bell et al. |
| 5,192,854 | A | 3/1993 | Counts |
| 5,237,418 | A | 8/1993 | Kaneko |
| 5,268,928 | A | 12/1993 | Herh et al. |
| 5,371,573 | A | 12/1994 | Kagaya et al. |

(Continued)

FOREIGN PATENT DOCUMENTS

| | | |
|---|---|---|
| EP | 0710017 | 5/1996 |
| WO | 9637996 | 11/1996 |

(Continued)

OTHER PUBLICATIONS

Comdex—Mitsubishi Previews 40-inch DiamondWeb TV Nov. 19, 1996, Newsbytes.

(Continued)

*Primary Examiner* — Hunter B Lonsberry
(74) *Attorney, Agent, or Firm* — Schiff Hardin LLP

(57) ABSTRACT

A device for provisioning, retrieving, and using data guide information transmitted in a digital broadcast signal is disclosed. A receiver receives the digital broadcast signal which includes digital television programming packets multiplexed with data packets and thereafter routes the received signal to a demodulator. The demodulator provides a demodulated signal to a detector which identifies data packets contained therein. A processor then determines the types of data in the data packets, as well as the respective channels on which the identified types of data are transmitted. The processor prepares a menu for a display screen enabling a user to select the channel of interest, and enables the user to be connected accordingly.

6 Claims, 2 Drawing Sheets

(56) References Cited

U.S. PATENT DOCUMENTS

| | | | | |
|---|---|---|---|---|
| 5,380,991 | A | 1/1995 | Valencia et al. | |
| 5,432,561 | A | 7/1995 | Strubbe | |
| 5,453,796 | A | 9/1995 | Duffield et al. | |
| 5,519,780 | A | 5/1996 | Woo et al. | |
| 5,594,509 | A * | 1/1997 | Florin et al. | 725/43 |
| 5,604,542 | A | 2/1997 | Dedrick | |
| 5,638,113 | A | 6/1997 | Lappington et al. | |
| 5,650,831 | A | 7/1997 | Farwell | |
| 5,665,953 | A | 9/1997 | Mazzamuto et al. | |
| 5,666,293 | A | 9/1997 | Metz et al. | |
| 5,699,104 | A | 12/1997 | Yoshinobu | |
| 5,710,605 | A | 1/1998 | Nelson | |
| 5,734,413 | A | 3/1998 | Lappington et al. | |
| 5,754,864 | A | 5/1998 | Hill | |
| 5,761,606 | A | 6/1998 | Wolzien | |
| 5,767,897 | A | 6/1998 | Howell | |
| 5,774,664 | A | 6/1998 | Hidary et al. | |
| 5,774,666 | A | 6/1998 | Portuesi | |
| 5,778,181 | A | 7/1998 | Hidary et al. | |
| 5,784,095 | A * | 7/1998 | Robbins et al. | 725/49 |
| 5,801,753 | A | 9/1998 | Eyer et al. | |
| 5,818,441 | A | 10/1998 | Throckmorton et al. | |
| 5,818,935 | A | 10/1998 | Maa | |
| 5,844,552 | A | 12/1998 | Gaughan et al. | |
| 5,872,588 | A | 2/1999 | Aras et al. | |
| 5,880,769 | A | 3/1999 | Nemirofsky et al. | |
| 5,889,506 | A | 3/1999 | Lopresti | |
| 5,892,536 | A | 4/1999 | Logan et al. | |
| 5,905,476 | A | 5/1999 | McLaughlin et al. | |
| 5,907,322 | A | 5/1999 | Kelly et al. | |
| 5,923,379 | A | 7/1999 | Patterson | |
| 5,929,849 | A | 7/1999 | Kikinis | |
| 5,940,073 | A * | 8/1999 | Klosterman et al. | 345/721 |
| 5,940,074 | A | 8/1999 | Britt et al. | |
| 5,946,047 | A | 8/1999 | Levan | |
| 5,977,963 | A | 11/1999 | Gaughan et al. | |
| 5,978,013 | A | 11/1999 | Jones | |
| 6,002,394 | A | 12/1999 | Schein | |
| 6,002,450 | A | 12/1999 | Darbee et al. | |
| 6,008,836 | A | 12/1999 | Bruck et al. | |
| 6,018,768 | A | 1/2000 | Ullman et al. | |
| 6,031,867 | A | 2/2000 | Johnson et al. | |
| 6,034,689 | A | 3/2000 | White et al. | |
| 6,035,304 | A | 3/2000 | Machida | |
| 6,040,829 | A | 3/2000 | Croy et al. | |
| 6,073,171 | A | 6/2000 | Gaughan et al. | |
| 6,097,383 | A | 8/2000 | Gaughan et al. | |
| 6,097,441 | A | 8/2000 | Allport | |
| 6,104,334 | A | 8/2000 | Allport | |
| 6,130,726 | A * | 10/2000 | Darbee et al. | 348/734 |
| 6,137,839 | A | 10/2000 | Mannering et al. | |
| 6,175,831 | B1 | 1/2001 | Weinreich et al. | |
| 6,177,931 | B1 | 1/2001 | Alexander et al. | |
| 6,181,326 | B1 | 1/2001 | Takahashi | |
| 6,182,287 | B1 * | 1/2001 | Schneidewend et al. | 725/48 |
| 6,219,839 | B1 * | 4/2001 | Sampsell | 725/40 |
| 6,240,555 | B1 | 5/2001 | Shoff et al. | |
| 6,272,680 | B1 | 8/2001 | Gaughan et al. | |
| 6,278,499 | B1 | 8/2001 | Darbee et al. | |
| 6,282,713 | B1 | 8/2001 | Kitsukawa et al. | |
| 6,313,887 | B1 | 11/2001 | Gudorf | |
| 6,317,885 | B1 | 11/2001 | Fries | |
| 6,349,410 | B1 | 2/2002 | Lortz | |
| 6,374,245 | B1 | 4/2002 | Park | |
| 6,397,387 | B1 | 5/2002 | Rosin et al. | |
| 6,401,059 | B1 | 6/2002 | Shen et al. | |
| 6,437,836 | B1 * | 8/2002 | Huang et al. | 348/734 |
| 6,732,369 | B1 | 5/2004 | Schein et al. | |
| 6,785,906 | B1 | 8/2004 | Gaughan et al. | |
| 6,792,616 | B1 | 9/2004 | Jerding et al. | |
| 6,802,076 | B1 | 10/2004 | Terakado et al. | |
| 6,882,299 | B1 | 4/2005 | Allport | |
| 6,925,444 | B1 | 8/2005 | McCollom | |
| 6,978,471 | B1 | 12/2005 | Klopfenstein | |
| 7,028,330 | B1 | 4/2006 | Gaughan et al. | |
| 7,340,763 | B1 | 3/2008 | Harris | |
| 7,372,915 | B1 | 5/2008 | Sako et al. | |
| 7,823,181 | B2 | 10/2010 | Gaughan et al. | |
| 7,827,583 | B2 | 11/2010 | Gaughan et al. | |
| RE43,988 | E * | 2/2013 | Sorensen | 725/51 |
| 2001/0003099 | A1 | 6/2001 | Von Kohorn | |
| 2002/0059637 | A1 | 5/2002 | Rakib | |
| 2003/0204854 | A1 | 10/2003 | Blackketter et al. | |
| 2005/0111823 | A1 | 5/2005 | Dureau | |
| 2007/0067805 | A1 | 3/2007 | Macrae et al. | |
| 2009/0091657 | A1 | 4/2009 | Gaughan et al. | |
| 2009/0100485 | A1 | 4/2009 | Gaughan et al. | |
| 2010/0146551 | A1 * | 6/2010 | Barton et al. | 725/46 |

FOREIGN PATENT DOCUMENTS

| | | |
|---|---|---|
| WO | 9847286 | 10/1998 |
| WO | 9857497 | 12/1998 |
| WO | 9913644 | 3/1999 |

OTHER PUBLICATIONS

Mitsubishi joins Internet TV market Screen Digest, Dec. 1, 1996.

Mitsubishi Takes Motorola MPC801 for Diamonweb TV Computergram International, Aug. 29, 1996.

Sony Internet Web page "Now Everyone can experience the Internet", 1996.

Shimakawa et al., Method of Controlling Reception in Data Broadcast Receiver, International Publication Date: Dec. 17, 1998, PCT WO 98/57497.*

* cited by examiner

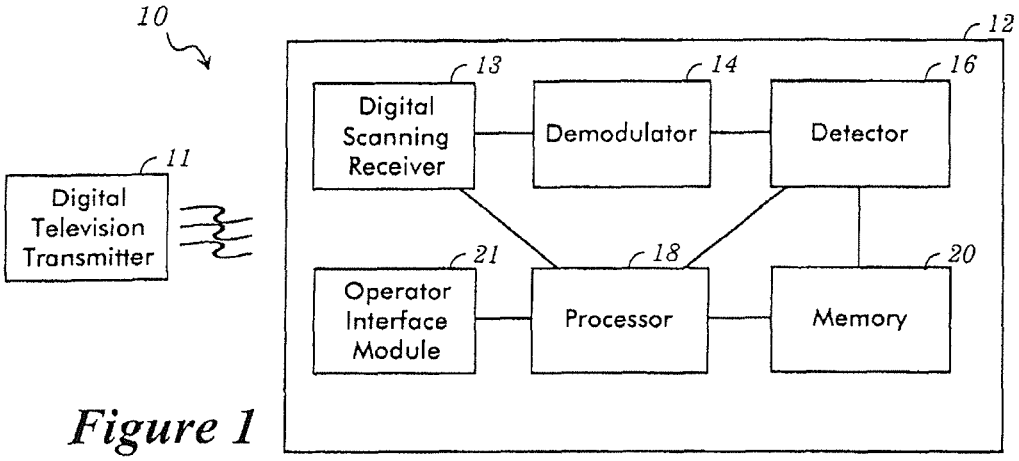
Figure 1
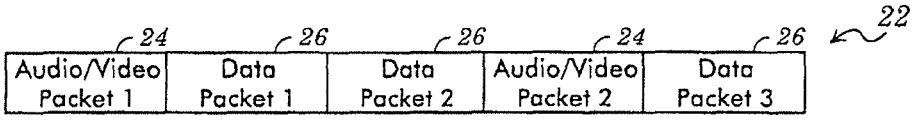
Figure 2
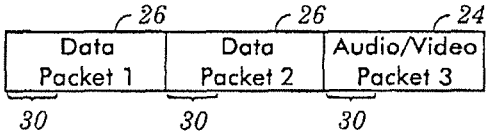
Figure 3
32
| Data Caster 2000 | |
|---|---|
| CH 2 | Price update for Grocery Shopping Service Program |
| CH 4 | Web Links to Today's Broadcast (HTML) |
| CH 5 | Business News Data Stream for 6/12/99 (quotes) |
| CH 8 | Sport Stats for the Super Bowl (excel) |
| CH 10 | Home Shopping Network Web Links for 6/12/99 |
| CH 22 | 1999 IRS Tax Forms (MS Word file) |
| CH 34 | WWW.CNBC.com (hyperlink with E-Coupons) |
| CH 65 | No data available |
Figure 4

APPARATUS AND METHOD FOR PROVIDING, RETRIEVING, AND USING DATA GUIDE INFORMATION SUPPLIED IN A DIGITAL VESTIGIAL SIDEBAND SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATIONS*

*The present application is a continuation of co-pending reissue application Ser. No. 13/223,513, filed Sep. 1, 2011, which is a continuation of reissue application Ser. No. 11/526,292, filed Sep. 22, 2006,—now issued as U.S. Pat. No. Re. 42,838 on Oct. 11, 2011—which is a continuation of application Ser. No. 11/187,031, filed Jul. 21, 2005,—now issued as U.S. Pat. No. Re. 42,764 on Sep. 27, 2011—which is a reissue application for U.S. Pat. No. 6,598,226, which issued on Jul. 22, 2003.*

*The present application is related to co-pending reissue application Ser. No. 12/705,071, filed Feb. 12, 2010, which is a continuation of reissue application Ser. No. 11/187,031—now issued as U.S. Pat. No. Re. 42,764 on Sep. 27, 2001—which is a reissue application for U.S. Pat. No. 6,598,226, which issued on Jul. 22, 2003.*

*The present application is related to co-pending reissue application Ser. No. 12/705,017, filed Feb. 12, 2010, which is a continuation of reissue application Ser. No. 11/187,031, filed Jul. 21, 2005—now issued as U.S. Pat. No. Re. 42,764 on Sep. 27, 2001—which is a reissue application for U.S. Pat. No. 6,598,226, which issued on Jul. 22, 2003.*

*The present application is related to co-pending reissue application Ser. No. 13/719,644, filed Dec. 19, 2012, which is a continuation of reissue application Ser. No. 12/705,071, filed Feb. 12, 2010—now issued as U.S. Pat. No. Re. 44,514 on October 1, 201 —which is a continuation of reissue application Ser. No. 11/187,031—now issued as U.S. Pat. No. Re. 42,764 on Sep. 27, 2001—which is a reissue application for U.S. Pat. No. 6,598,226, which issued on Jul. 22, 2003.*

TECHNICAL FIELD OF THE INVENTION

The present invention relates to an apparatus that enables a user to receive and utilize data which is broadcast via a digital vestigial sideband (VSB) broadcast signal.

BACKGROUND OF THE INVENTION AND PRIOR ART

The ATSC digital broadcast standard for digital television allows for the transmission of 19 Mbits/sec in an RF channel having a 6 MHZ bandwidth. Although this allocated bandwidth is adequate for a single analog NTSC television channel, the ATSC bit rate permits the same channel to support the concurrent transmission of several standard definition television (SDTV) programs (i.e., programs displayable with a resolution comparable to that of the NTSC analog program). Alternatively, the allocated bandwidth at the ATSC bit rate permits a channel to support the transmission of a single high definition television (HDTV) program at a time. Moreover, the ATSC digital broadcast standard permits data to be transmitted in the channel along with the digital program being transmitted. Therefore, data packets may be multiplexed in the channel with video and audio packets of one or more of the programs.

While channel guides in the form of a table displayed on a dedicated channel and providing channels, titles, and show times, currently exist for analog television programming, none exist which provide a similar guide or key for digital television as to the type of data transmitted on various channels. Moreover, no channel or data guides exists which enable various entries in the guide to be selected by a user for access to further information.

The present invention contemplates using the data transmission feature of the ATSC standard in order to transmit data guide information in the data packets. The data guide may include identifying information as to the channels under which data is transmitted with the digital VSB broadcast signals, as well as the type of data provided on each channel. The invention further contemplates displaying the transmitted data guide in a format enabling a user to select and access the data on any of the displayed channels.

SUMMARY OF THE INVENTION

In accordance with one aspect of the present invention, a device identifies types of data transmitted on multiple channels of a digital broadcast signal, displays the identified types of data transmitted on each channel, and enables a user to access the data transmitted on a particular channel. The device comprises a scanning receiver, a demodulator, a detector, a memory, a processor, and an operator interface module. The scanning receiver is adapted to tune to the digital broadcast signal on selected channels, and the digital broadcast signal includes at least one digital television programming packet and at least one data packet. The demodulator is coupled to the receiver and is adapted to demodulate the digital broadcast signal. The detector is coupled to the demodulator and is adapted to detect the at least one data packet. The memory is coupled to the detector, and the memory is adapted to store data guide software code for identifying the type of data contained in the at least one data packet and the channel on which the identified type of data is available. The data guide software is further adapted to enable the data on any channel selected by an operator to be accessed. The processor is coupled to the memory and is adapted to execute the data guide software code. The operator interface module is coupled to the processor, and is adapted to display the identified types of data and the channels on which the identified types of data are available. The operator interface module is further adapted to enable any displayed channel to be selected.

According to another aspect of the present invention, a method of providing a data guide summarizing types of data transmitted in a digital broadcast signal and the channels corresponding to the types of data is provided. The method includes the steps of receiving a digital broadcast signal containing digital programming packets and data packets, demodulating the digital broadcast signal, detecting the data packets, storing the data guide based on information contained in the data packets, and displaying the data guide.

According to another aspect of the present invention, a data casting system is provided which comprises a receiver, a detector coupled to the receiver, and a operator interface module coupled to the detector. The receiver is adapted to receive a digital broadcast signal containing at least one digital television programming packet and at least one data packet. The detector is adapted to detect the at least one data packet and is further adapted to detect types of data transmitted within the at least one data packet and channels on which the detected types of data are available. The screen is adapted to display the detected types of data and the channels on which the detected types of data are available.

According to a further aspect of the present invention, a computer readable storage medium of a digital program receiver having a data guide stored thereon is provided, wherein the data guide contains a list of the types of data receivable by the digital program receiver and the corresponding RF channels in which the data is present.

BRIEF DESCRIPTION OF THE DRAWINGS

The features and advantages of the present invention will become more apparent from a detailed consideration of the invention taken in conjunction with the drawings in which:

FIG. 1 illustrates a data guide system according to one embodiment of the present invention;

FIG. 2 illustrates a sample portion of a digital vestigial sideband (VSB) signal having a set of digital programming packets multiplexed with a set of data packets;

FIG. 3 illustrates data packets and digital television programming packets having an identification header;

FIG. 4 illustrates a sample data guide display screen according to the present invention.

DESCRIPTION OF THE PREFERRED EMBODIMENT

Figure 5:
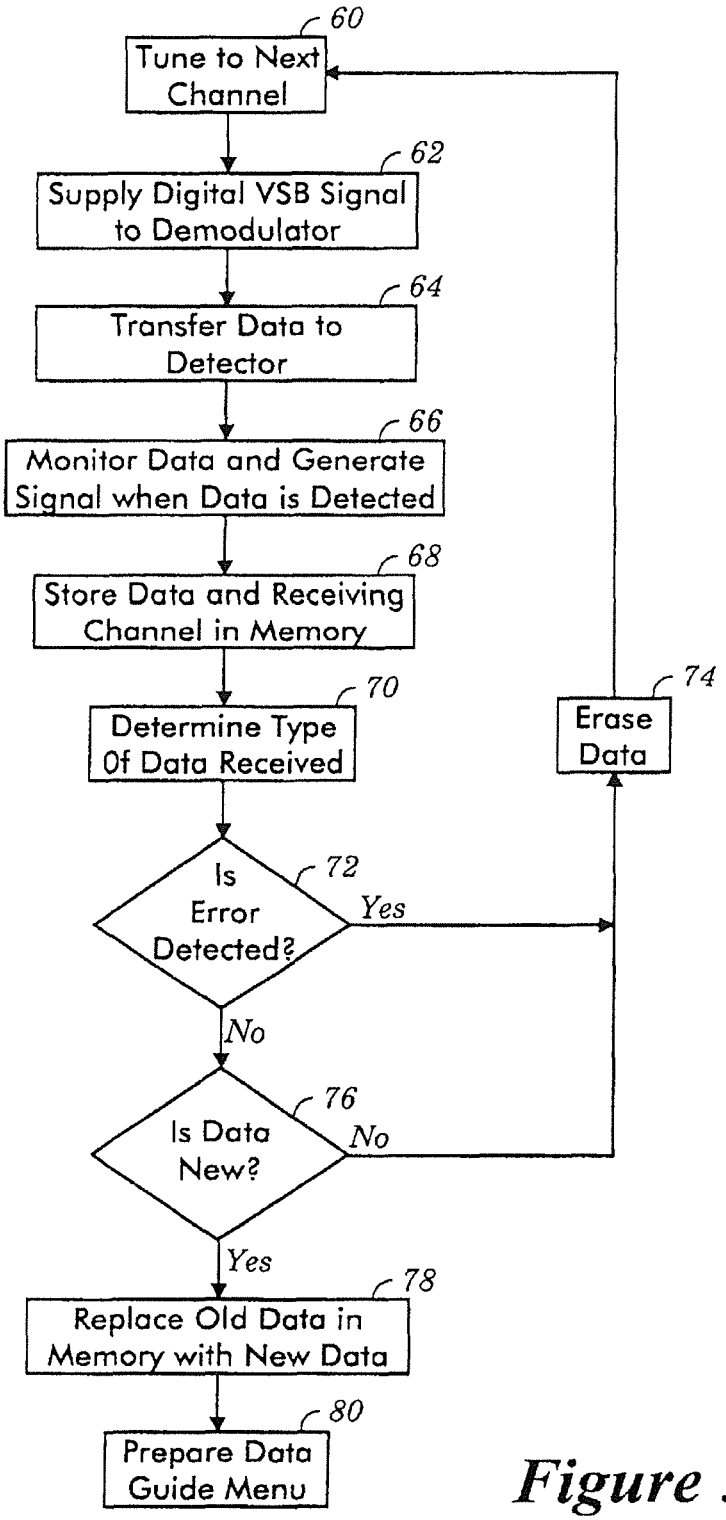
FIG. 5 illustrates a flow chart of a method for retrieving a digital VSB broadcast signal, extracting at least one data packet from the digital VSB broadcast signal, determining the type of data received, and generating a data guide according to the present invention.

Referring now to the drawings, wherein like reference numerals designate identical or corresponding parts throughout the several figures, and more particularly to FIG. 1, a data guide system according to the present invention is generally depicted by reference numeral 10. The data guide system 10 includes a digital vestigial sideband (VSB) broadcast signal transmitter 11 (such as a digital television provider), and a datacasting receiver 12.

The datacasting receiver 12 includes a digital scanning receiver 13, a demodulator 14, a detector 16, a processor 18, a memory 20, and an operator interface module 21. The digital scanning receiver 13 is a tunable receiver which is able to scan through and be tuned to the RF channels within the bands allocated to the digital scanning receiver 13, including, for example, any of the RF channels in any of the bands allocated for digital television viewing. In operation, the digital scanning receiver 13 receives a digital VSB broadcast signal which is defined to include any of a 2 digital VSB, a 4 digital VSB, an 8 digital VSB, an 8T digital VSB or a 16 digital VSB signal, transmitted via one of the RF channels. As will be discussed in further detail herein, the digital scanning receiver 13 may be an existing receiver of a device such as a digital television or personal computer, or may be a separate receiver dedicated to the data guide system 10.

Referring to FIG. 2, a sample portion of a digital VSB broadcast signal 22 to which the digital scanning receiver 13 may be tuned is depicted. As shown therein, the digital VSB broadcast signal 22 includes a set of digital television (DTV) programming packets 24 having audio and video components multiplexed with a set of data packets 26. The DTV programming packets 24 and data packets 26 are both formatted in conformance with the ATSC standard and thus have symbols and symbol rates as specified therein.

The digital scanning receiver 13 scans through all available channels, and at each channel tunes to the corresponding digital VSB broadcast signal 22. The demodulator 14 demodulates the digital VSB broadcast signal 22 from the digital scanning receiver 13.

In accordance with the ATSC standard and as shown in FIG. 3, each of the data packets 26 and each of the digital television programming packets 24 are identifiable via a predefined sequence of identification bits [not shown in detail] residing at a location allocated as a header 30.

Preferably, the detector 16 is implemented with a software application that is stored in the memory 20. The software application preferably has search engine capabilities, such that in order to enable identification of the DTV programming packets 24 and the data packets 26, the software application compares the header 30 of each DTV programming packet 24 and each incoming data packet 26 to pre-defined bit sequences used to identify the relevant packets. The detector 16 then passes the identified DTV programming packets 24 to appropriate video and/or audio processors (not shown). When the detector 16 recognizes that a relevant data packet 26 is received on the particular channel to which the digital scanning receiving 13 is currently tuned, the detector 16 transmits an appropriate signal to the processor 18.

The signal from the detector 16 to the processor 18 indicates to the processor 18 that the received data and channel on which it has been received should be stored in the memory 20, and that the processor 18 must interpret the data packet 26 to determine the particular type of data received. This interpretation may be accomplished similar to the manner in which the presence of the data packet 26 is determined. More specifically, the header 30 or the data portions of a data packet may include a predetermined bit stream which the processor 18 may compare to a database of bit streams stored in memory 20. For example, the bit streams may indicate that the data following the header comprises: price update information for a grocery shopping service program, addresses of relevant websites related to the digital television programming packet 24, business news, sports statistics, government tax forms, etc. If website addresses are included, they may allow an HTML link program, such as a web browser, to seek out a website that is associated with the DTV programming packet 24.

Alternatively, once the processor 18 receives the signal from the detector indicating that a data packet 26 has been received, the processor 18 may utilize a template stored in the memory 20 which automatically indicates the type of data received based on the channel to which the receiver 13 is tuned at the time of reception. In other words, it may be known that a particular channel always and only transmits business data, while another channel always and only transmits sports statistics. As a result, once the detector 16 determines that data is received, the processor 18 can reference the template to determine which type of data corresponds to the tuned channel.

Upon identifying the specific type of data received, the data packets 26 are checked for errors. The processor 18 uses an error checking program to examine the data packets 26 for errors, such as those typically caused by discontinuities from storms or multi-path interferences. If an error is detected, data is erased and the system tunes to the next channel to retrieve data. The data from the current channel can be retrieved the next time it is transmitted.

If no error is detected, the processor 18 determines if the data type corresponding to the data transmitted in the current channel is new or updated since the last time that data type was received on that particular channel. Such checking can be performed through a comparison-of the received data packets 26 to the previous data type stored in the memory 20. If the received data type of the data contained in the current channel is not new, it is erased. If this data type is new, the data type is stored in the memory 20, replacing the previously stored data type.

Also, if the data type is determined to be new, the processor 18 executes data guide software to generate or update a menu 32 containing that data type. The operator interface module 21 can display the menu 32 at any time the user selects. The operator interface module 21 can be in the form of, for example, a computer monitor, a television screen, a liquid crystal display screen of a cellular telephone or personal digital assistant, or the like. The menu 32 could be displayed on a designated channel to which the user could tune when desired. Using a peripheral input device (not shown) associated with the operator interface module 21, such as a mouse, trackball, keyboard, remote control, or touch screen, a user can scroll through the displayed menu 32 and select the channel of interest. Once a particular channel is selected the processor 18 then directly connects the user to the desired channel, or if a website is selected, to the desired website. A representative menu 32 generated by the processor 18 is depicted in FIG. 4.

Referring now to FIG. 5, the method by which the data guide system 10 may function is depicted. As shown, the method begins at a block 60 where the digital scanning receiver 13 tunes to a channel containing the digital VSB broadcast signal 22. Once the signal 22 is tuned, control proceeds to a block 62 where the received VSB broadcast signal 22 is provided to the demodulator 14. The demodulator 14 demodulates the VSB broadcast signal 22. The digital television programming packets 24 and the data packets 26 are then transferred to the detector 16 at a block 64.

At a block 66, the detector 16 identifies the data packets 26. As will be understood by one having ordinary skill in the art, the data packets 26 may be transmitted by the digital television transmitter 11 at selected times during the day and may be transmitted repeatedly at convenient intervals. If the digital receiver 12 contains a single tuner in the form of the digital scanning receiver 13, the data monitoring step 66 may be performed during non-prime time hours so as not interfere with heavier prime time usage of the digital broadcast. Alternatively, the datacasting receiver 12 could include one tuner for normal usage and reception of the digital television broadcast, and a separate scanning tuner dedicated to scanning through all channels in search of data being received. Accordingly, the tuning step 60 and monitoring step 66 need not be limited to any particular period of usage.

As described earlier, the monitoring process preferably involves launching a search engine application that causes the detector 16 to search for a predefined sequence of identification bits located in the header 30 of each DTV programming packet 24 and each data packet 26 wherein the predefined sequence of bits indicate a data packet 26.

If it is determined that a data packet 26 has been detected, the data and the channel on which this data packet 26 was received are stored in the memory 20 as indicated by a block 68, and the detector 16 generates a signal which causes control to pass to a block 70 where the processor 18 determines the type of data detected. As indicated above this can be performed in numerous ways including performing a comparison of bit streams to a database of known bit streams, or using a template to determine the type of data always transmitted on the channel to which the receiver 13 is tuned.

Once the type of data is determined, the processor 18 performs an error checking routine, as indicated at a block 72, to determine whether any of the received data has been tainted by, for example, discontinuities caused by storms or multipath interference. If an error is detected, the retrieved data is erased as indicated by a block 74 and control returns to the block 60 to enable the next channel to be checked. As described hereinbefore, since the data is transmitted periodically, error-free data packets 26 can be retrieved from a later transmission. In alternative embodiments, the error checking step can be performed at a different time, including before the storing step 68.

If no error is detected at the block 72, control proceeds to a block 76 where the processor 18 determines if the data type is new or updated since the last time the monitoring step 66 was performed. The processor 18 compares the data type determined at the block 70 to the data type contained in the menu 32 stored in the memory 20 corresponding to the tuned channel. If the data type is determined not to be new, the data type is erased at the block 74 and control returns to the block 60 wherein the next channel is checked.

If the data type is determined to be new, control passes to a block 78 wherein the received data type replaces the old data contained in the menu 32 stored in the memory 20. The channel to which the receiver 13 is tuned at that time is also determined and stored in the memory 20. The channel on which the current data is received may be utilized as an address into the memory 20 corresponding to the relevant line in the menu 32.

At any time selected by the user, the processor 18 causes the menu 32 to be displayed by the operator interface module 21, such as on a channel dedicated to providing a data guide. When tuned to the dedicated data guide channel, the user can scroll through the menu 32 and select any one of the displayed channels. The processor 18 responds to the received user input by connecting to the selected channel, or if web links are included in the selected channel, to the selected website assuming that the datacasting receiver 12 is web enabled.

In an alternative embodiment, data guide information as contained in the menu 32 could be transmitted on a single channel. As a result, the step of scanning all channels need not be performed, but rather the single channel on which the data is transmitted could be periodically checked and the memory 20 and menu 32 could be updated when new data is received.

Although it is suggested that the detector 16 be implemented using a software application having search engine capabilities, it may instead be implemented using hardware or firmware. For example, the detector 16 may be implemented using an ASIC device configured to behave like a gate array such that the device, when presented with the proper predefine data sequence, allows the data to pass therethrough.

Certain modifications of the present invention have been discussed above. Other modifications will occur to those practicing in the art of the present invention. For example, the present invention has been described above at least in part in relation to providing a data guide based upon data transmitted in a digital vestigial sideband (VSB) broadcast signal. However, it should be noted that the present invention also is applicable to providing a data guide based upon data transmitted in other types of digital broadcast signals such as COFDM signals, QAM signals, QPSK signals, and/or the like.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

[1. A device for identifying types of data transmitted on multiple channels of a digital broadcast signal, displaying the identified types of data transmitted on each channel, and enabling a user to access the data transmitted on a particular channel, the device comprising:

a scanning receiver adapted to tune to the digital broadcast signal on selected channels, the digital broadcast signal including at least one digital television programming packet and at least one data packet;

a demodulator coupled to the receiver and adapted to demodulate the digital broadcast signal;

a detector coupled to the demodulator and adapted to detect the at least one data packet;

a memory coupled to the detector, the memory being adapted to store data guide software code for identifying the type of data contained in the at least one data packet and the channel on which the identified type of data is available, the data guide software further being adapted to enable the data on any channel selected by an operator to be accessed;

a processor coupled to the memory and adapted to execute the data guide software code; and, an operator interface module coupled to the processor, the operator interface module being adapted to display the identified types of data and the channels on which the identified types of data are available, the operator interface module further being adapted to enable any displayed channel to be selected.]

[2. The device of claim 1 wherein the processor comprises a central processing unit of a personal computer, and the operator interface module comprises a video monitor and an input device.]

[3. The device of claim 1 wherein the operator interface module comprises a display of a personal digital assistant.]

[4. The device of claim 1 wherein the operator interface module comprises a display of a telephone.]

[5. The device of claim 4 wherein the telephone comprises a cellular telephone.]

[6. The device of claim 1 wherein the processor comprises a processing unit of a television, and the operator interface module comprises a display screen of the television.]

[7. The device of claim 1 wherein the at least one data packet includes at least one link to a website, the operator interface module enables the at least one website to be selected, and wherein the processor enables the at least one website to be accessed.]

[8. The device of claim 1 wherein the data guide software code generates a data guide in menu format for display on the operator interface module.]

[9. The device of claim 8 wherein the operator interface module enables the operator to scroll through the menu before selecting a particular channel.]

[10. A method of providing a data guide summarizing types of data transmitted in a digital broadcast signal and the channels corresponding to the types of data comprising the steps of:

receiving the digital broadcast signal containing digital programming packets and data packets;

demodulating the digital broadcast signal;

detecting the data packets;

storing the data guide based on information contained in the data packets; and, displaying the data guide.]

[11. The method of claim 10 wherein the digital broadcast signal is transmitted in multiple channels, and wherein the receiving step is performed by scanning through the multiple channels.]

[12. The method of claim 10 further including the step of selecting one of the identified channels and gaining access to data transmitted on the selected channel.]

[13. The method of 10 performed by a central processing unit of a personal computer, wherein the displaying step is performed using a video monitor connected to the personal computer.]

[14. The method of claim 10 performed by a processor of a television, wherein the displaying step is performed using a video screen of the television.]

[15. The method of claim 10 wherein the displaying of the data guide comprises displaying the data guide on a display of a personal digital assistant.]

[16. The method of claim 10 wherein the displaying of the data guide comprises displaying the data guide on a display of a telephone.]

[17. The method of claim 16 wherein the telephone comprises a cellular telephone.]

[18. A data casting system comprising:

a receiver adapted to receive a digital broadcast signal containing at least one digital television programming packet and at least one data packet;

a detector coupled to the receiver and adapted to detect the at least one data packet, the detector further adapted to detect types of data transmitted within the at least one data packet and channels on which the detected types of data are available; and, an operator interface module coupled to the detector and adapted to display the detected types of data and the channels on which the detected types of data are available.]

[19. The data casting system of claim 18 further including a processor coupled to the detector, the processor being adapted to execute data guide software, the data guide software generating a menu based on the types of data and channels detected by the detector, the menu being displayed on the operator interface module.]

[20. The data casting system of claim 19 wherein the operator interface module allows any of the displayed channels to be selected, and the data guide software and processor connect the operator interface module to the selected channel.]

[21. The data casting system of claim 20 wherein the at least one channel includes at least one link to a website.]

[22. A computer readable storage medium of a digital program receiver having a data guide stored thereon, wherein the data guide contains a list of the types of data receivable by the digital program receiver and the corresponding RF channels in which the data is present.]

[23. The computer readable storage medium of claim 22 wherein the data guide is a menu.]

[24. The computer readable storage medium of claim 23 wherein the menu contains selectable items.]

*25. A method for controlling an error while processing data providing full information on a data broadcast in a digital receiver, the method comprising:*

*receiving the data providing full information on the data broadcast, wherein the data is transmitted repeatedly at specific intervals from a transmitter, the data comprising a header and a body, and further the header comprises information which is used to identify application types;*

*monitoring the data for the application types that the digital receiver can decode;*

*detecting an error located in a portion of the data providing full information on the data broadcast; and*

*discarding the portion having the detected error.*

*26. The method of claim 25, wherein the application is a functional implementation realized as software.*

*27. The method of claim 25, wherein the method further comprises a step of processing a next portion if there is the next portion.*

*28. The method of claim 25, wherein the method further comprises a step of processing the data having a new version.*

*29. The method of claim 28, wherein the step of processing replaces data having an old version in a memory with the data having the new version.*

*30. The method of claim 25, wherein the digital receiver corresponds to a digital television, a personal computer or a separate receiver.*

* * * * *